Dec. 4, 1956     J. R. EASTMAN     2,772,929

MOTOR END BELL STRUCTURE

Filed March 31, 1955

INVENTOR.
JOHN R. EASTMAN
BY HIS ATTORNEYS.
HARRIS, KIECH, FOSTER & HARRIS

United States Patent Office 2,772,929
Patented Dec. 4, 1956

2,772,929

MOTOR END BELL STRUCTURE

John R. Eastman, Pasadena, Calif., assignor to Sterling Electric Motors, Inc., Los Angeles, Calif., a corporation of California Application March 31, 1955, Serial No. 498,312

7 Claims. (Cl. 308—236)

The present invention relates in general to end bell structures for electric motors, or the like, and, more particularly, to a structure for assembling a motor end bell with a bearing, preferably a ball bearing, on the armature shaft of the motor, a primary object of the invention being to provide an improved structure of this nature which is simple and effective.

More specifically, an object of the invention is to provide means for assembling the bearing and the end bell which is operable entirely from the exterior of the end bell so that access to the interior of the end bell for the purpose is unnecessary.

Another object is to provide pivoted elements within the end bell adjacent the bearing and adapted to be swung over the inner side of the bearing, e. g., over the inner face of the outer race of the ball bearing, after the end bell and the bearing are in the proper relative positions, and to provide means operable entirely from the exterior of the end bell for swinging such pivoted elements over the inner side of the bearing and for clamping them against such inner side.

A further object of the invention is to provide a structure which includes elements pivotable over the inner side of the bearing, stop means on the end bell internally thereof for limiting pivotal movement of the pivoted elements, rotatable actuating elements extending through the end bell into the interior thereof and rotatable from the exterior thereof, and mutilated thread means connecting the pivoted elements to the actuating elements so as to provide resistance to rotation of the actuating elements relative to the pivoted elements, whereby rotation of the actuating elements from the exterior of the end bell first swings the pivoted elements over the inner side of the bearing against the stop means to prevent further pivoting of the pivoted elements, and then draws the pivoted elements outwardly against the inner side of the bearing to assemble it and the end bell.

Another object is to provide pivoted elements having holes therein into which the actuating elements are threaded, the threads on one set of these elements being mutilated for the purpose outlined above.

Still another object is to provide pivoted elements having threaded holes the threads in which are mutilated to provide resistance to relative rotation of the pivoted elements and the actuating elements for the purpose hereinbefore set forth.

Still another object is to provide pivoted elements having threaded holes therein, each pivoted element having a depression therein at one end of the threaded hole therein, said depression being formed after forming the threads in the hole so as to mutilate the threads at that end of the hole where the depression is located.

Another object is to provide a triangular depression made with a triangular punch, or the like.

The foregoing objects, advantages and features of the present invention, together with various other objects, advantages and features thereof which will become apparent, may be attained with the exemplary embodiment of the invention which is illustrated in the accompanying drawing and which is described in detail hereinafter. Referring to the drawing.

Figure 1:
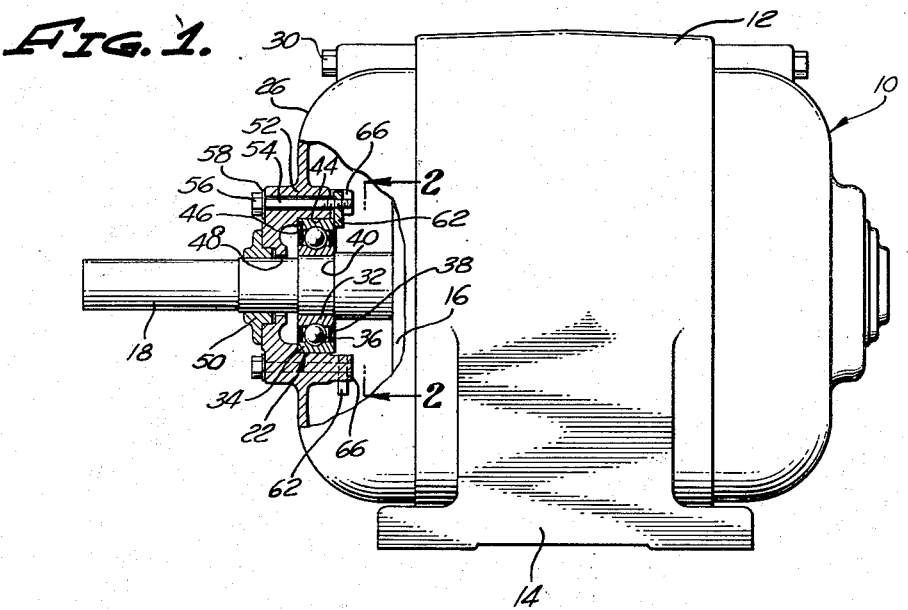
Fig. 1 is a side elevational view of an electric motor in which the present invention has been incorporated, one end of the motor being shown in section to reveal the manner in which the present invention is incorporated therein.

Referring to Fig. 1 of the drawing, the numeral 10 designates generally an electric motor which, except for incorporating the present invention therein, is conventional. Briefly, the motor 10 includes the customary housing 12 which is provided with the usual base 14 for mounting the motor on any suitable supporting structure, not shown. The motor 10 includes a rotor 16 carried by a shaft 18 mounted in ball bearings one of which is shown and designated by the numeral 22. This bearing is carried by an end bell 26 secured to the housing 12 by one or more bolts 30.

The bearing 22 includes an inner race 32 and an outer race 34 separated by balls 36, the particular bearing shown being of the sealed type and being equipped with lubricant retainers 38. The inner race 32 is seated against a shoulder 40 on the shaft 18. The outer race 34 of the bearing is disposed in a recess 44 in the end bell 26 and is seated against an inwardly facing shoulder 46. The shaft 18 projects through an opening 48 in the end bell 26 and carries a collar 50.

The end bell 26 is provided with bosses 52 adjacent the bearing recess 44 and through these bosses extend rotatable actuating bolts or screws 54. The screws 54 are provided with heads 56 externally of the end bell, lock washers 58 preferably being disposed under the heads. The inner ends of the screws 54 are externally threaded and are threaded into internally threaded holes 60, Fig. 3, in pivoted elements or dogs 62. The threads on the screws 54 or in the dogs 62 are mutilated to resist rotation of the screws relative to the dogs. In the structure shown, the threads in the hole 60 in the dogs 62 are mutilated by forming depressions 64 in the dogs 62 at the inner ends of the holes 60. (The term "inner" as used herein is applied to surfaces facing in the same direction as the inner surface of the end bell 26.) Triangular depressions 64, as shown, which are preferably formed with a triangular punch after the threads in the hole 60 are formed, provide satisfactory mutilation of the threads in the hole 60.

Pivotal movement of the dogs 62 with the screws 54 as the latter are rotated from the exterior of the end bell 26 is limited by stop means or stops 66 with which the dogs are engageable. The stops 66 are formed on the inner surfaces of the bosses 52 adjacent the bearing recess 44 and adjacent the respective screws 54, the distance between the stops 66 and the axes of the screws 54 being less than the maximum radius of the dogs 62.

Figure 2:
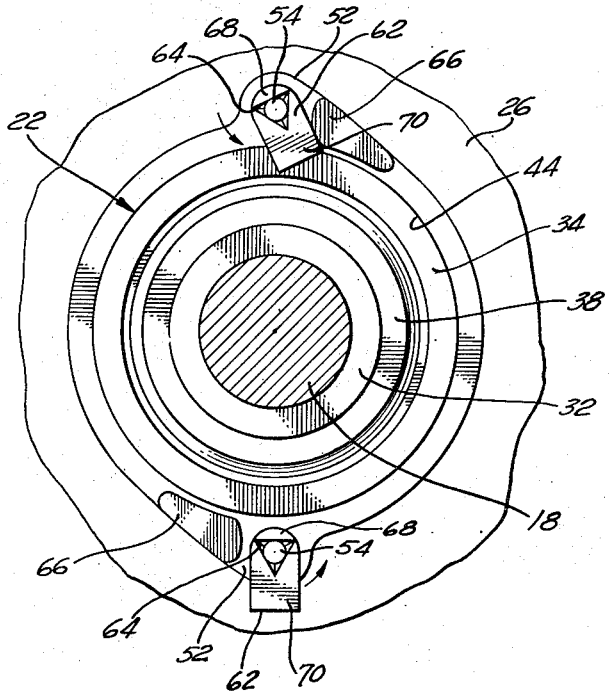
Fig. 2 is an enlarged, fragmentary, transverse sectional view taken along the arrowed line 2—2 of Fig. 1.
Figure 3:
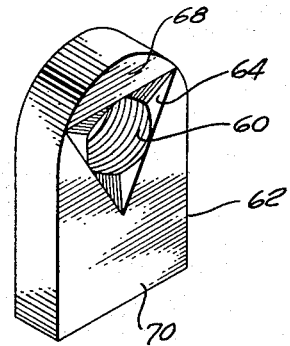
Fig. 3 is an enlarged, isometric view of one of the pivoted elements of the invention hereinbefore mentioned.

As best shown in Figs. 2 and 3 of the drawing, the hole 60 through each dog 62 is located adjacent one end thereof so as to provide each dog with a short arm 68 on one side of the hole and a long arm 70 on the opposite side thereof. The length of the short arms 68 of the dogs 62, measured from the centers of the holes 60, is less than the distance from the axes of the screws 54 to the bearing recess 44 so that, when the short arms 68 of the dog 62 are directed toward the bearing recess, the bearing 22 may move into such recess, the dogs 62 being disengaged from the stops 66 under such conditions. However, when the long arms 70 of the dogs 62 face the bearing recess 44, they are swung inwardly over the inner side of the bearing 22 and engage the stops 66, as indicated in the upper half of Fig. 2 of the drawing.

Considering the manner in which the bearing 22 and the end bell 26 are assembled, after the bearing is placed on the shaft 18, the end bell is placed in the position shown. As this is done, the dogs 62 are in the position shown in the lower half of Fig. 2 so that the bearing may enter the recess 44 therefor. With the bearing 22 in the recess 44, a suitable tool is applied to the heads 56 of the screws 54 and these screws are then rotated to swing the dogs 62 over the inner side of the bearing 22 and into engagement with the stops 66, as shown in the upper half of Fig. 2 of the drawing. Such initial rotation of the screws 54 does not produce rotation of the dogs 62 relative thereto due to the thread mutilation hereinbefore discussed. However, once the long arms 70 of the dogs 62 overlie the inner side of the bearing 22 and engage the stops 66, continued rotation of the screws 54 results, of course, in rotation thereof relative to the dogs in opposition to the resistance provided by the thread mutilation. Consequently, the screws 54 advance in the threaded holes 60 in the dogs 62 to draw the dogs toward the inner side of the bearing 22 and clamp the long arms 70 thereof against the inner side of the bearing. Such rotation of the screws 54 is continued until the desired degree of tightness is attained, the bearing 22 and the end bell 26 then being securely assembled with the bearing in the recess 44. The end bell 26 may be bolted to the housing 12 either before or after assembling the bearing 22 and the end bell 26 in the foregoing manner.

Thus, the present invention provides a simple and positive way of assembling the bearing and the end bell without any necessity for aligning screws and holes, as has been the practice heretofore, it merely being necessary to swing the long arms 70 of the dogs 62 out of the way to permit entry of the bearing into its recess in the end bell. Thereupon, the screws 54 may be rotated to clamp the bearing in place.

Although I have disclosed an exemplary embodiment of my invention herein in an exemplary environment, it will be understood that various changes, modifications and substitutions may be incorporated in such embodiment and that such embodiment may be utilized in other environments, all without departing from the spirit of the invention.

I claim as my invention:

1. In a structure of the character described, the combination of: an end bell for an electric motor, said end bell having an internal bearing recess therein; a bearing in said recess; pivotable means in said end bell adjacent said recess and pivotable over the inner side of said bearing; and means extending through said end bell and operable from the exterior thereof for pivoting said pivotable means over the inner side of said bearing.

2. In a structure of the character described, the combination of: an end bell for an electric motor, said end bell having an internal bearing recess therein; a bearing in said recess; pivotable means in said end bell adjacent said recess and pivotable over the inner side of said bearing; means extending through said end bell and operable from the exterior thereof for pivoting said pivotable means over the inner side of said bearing; and means extending through said end bell and operable from the exterior thereof for clamping said pivotable means against the inner side of said bearing.

3. In a structure of the character described, the combination of: an end bell for an electric motor, said end bell having an internal bearing recess therein; a bearing in said recess; pivoted elements in said end bell adjacent said recess and pivotable over the inner side of said bearing; stop means on said end bell for limiting pivotal movement of said pivoted elements; and means extending through said end bell and operable from the exterior thereof for pivoting said pivoted elements over the inner side of said bearing into engagement with said stop means and for subsequently clamping said pivoted elements against the inner side of said bearing.

4. In a structure of the character described, the combination of: an end bell for an electric motor, said end bell having an internal bearing recess therein; a bearing in said recess; pivoted elements in said end bell adjacent said recess and pivotable over the inner side of said bearing; stop means for limiting pivotal movement of said pivoted elements; screw elements extending through said end bell into the interior thereof and rotatable from the exterior thereof and threadedly engaging said pivoted elements; and rotation resisting means tending to prevent relative rotation of said pivoted elements and said screw elements, whereby rotation of said screw elements from the exterior of said end bell first swings said pivoted elements over the inner side of said bearing against said stop means and then draws said pivoted elements against the inner side of said bearing.

5. In a structure of the character described, the combination of: an end bell for an electric motor, said end bell having an internal bearing recess therein; a bearing in said recess; pivoted elements in said end bell adjacent said recess and pivotable over the inner side of said bearing; stop means on said end bell for limiting pivotal movement of said pivoted elements; rotatable actuating elements extending through said end bell into the interior thereof and rotatable from the exterior thereof; and mutilated thread means connecting said pivoted elements to said actuating elements, whereby rotation of said actuating elements from the exterior of said end bell first swings said pivoted elements over the inner side of said bearing against said stop means and then draws said pivoted elements against the inner side of said bearing.

6. A structure as defined in claim 5 wherein each of said pivoted elements has a threaded hole therethrough into which the corresponding one of said actuating elements is threaded, and is provided with a depression therein at one end of said hole mutilating the threads therein.

7. In a structure for assembling two members one of which is relatively inaccessible from the exterior of the other, the combination of: a pivoted element in said other member adjacent said one member and pivotable over the inner side of said one member; stop means on said other member and engageable by said pivoted element for limiting pivotal movement of said pivoted element to a position over the inner side of said one member; a rotatable actuating element extending through said other member into the exterior thereof and rotatable from the exterior thereof; and mutilated threads connecting said pivoted element to said actuating element so as to resist relative rotation of said pivoted element and said actuating element, said pivoted element having a threaded hole therethrough and said actuating element being threaded into said hole, said pivoted element having a depression therein at one end of said hole mutilating the threads in said hole at said one end thereof, whereby rotation of said actuating element from the exterior of said other member first swings said pivoted element over the inner side of said one member and against said stop means to limit pivotal movement of said pivoted element, and then draws said pivoted element against the inner side of said one member.

References Cited in the file of this patent

UNITED STATES PATENTS

| | | |
|---|---|---|
| 1,027,397 | Adam | May 28, 1912 |
| 2,283,304 | Williams | May 19, 1942 |
| 2,536,784 | Tamm | Jan. 2, 1951 |